United States Patent [19]

Buysch et al.

[11] Patent Number: 4,839,421

[45] Date of Patent: Jun. 13, 1989

[54] ANTISTATIC, THERMOPLASTIC MOULDING COMPOUND BASED ON POLYCARBONATES AND AROMATIC VINYL POLYMERS

[75] Inventors: Hans-Josef Buysch; Norbert Schön, both of Krefeld; Herbert Eichenauer, Dormagen, all of Fed. Rep. of Germany; Hans-Jürgen Kress, Pittsburgh, Pa.; Josef Buekers, Krefeld, Fed. Rep. of Germany

[73] Assignee: Bayer Aktiengesellschaft, Leverkasen, Fed. Rep. of Germany

[21] Appl. No.: 151,288

[22] Filed: Feb. 1, 1988

[30] Foreign Application Priority Data

Feb. 13, 1987 [DE] Fed. Rep. of Germany ....... 3704488

[51] Int. Cl.$^4$ ...................... C08L 69/00; C08L 51/04
[52] U.S. Cl. ......................................... 525/67; 525/64

[58] Field of Search ..................................... 525/64, 67

[56] References Cited

U.S. PATENT DOCUMENTS

| | | | |
|---|---|---|---|
| 3,110,695 | 11/1963 | Ceresa ................... | 525/418 |
| 4,435,541 | 3/1984 | Brandstetter et al. .............. | 525/187 |
| 4,683,265 | 7/1987 | Kress et al. ........................ | 525/67 |
| 4,719,263 | 1/1988 | Barnhouse et al. .................. | 525/64 |

*Primary Examiner*—Melvyn I. Marquis
*Assistant Examiner*—Susan Berman
*Attorney, Agent, or Firm*—Connolly and Hutz

[57] ABSTRACT

Thermoplastic moulding compounds consisting of 99.8–95% by weight of a mixture consisting of an aromatic polycarbonate, a graft polymer and optionally a thermoplastic vinyl polymer and/or the usual additives and 0.2 to 5% by weight of a polyalkylene ether which has been modified by a radical former.

4 Claims, No Drawings

ANTISTATIC, THERMOPLASTIC MOULDING COMPOUND BASED ON POLYCARBONATES AND AROMATIC VINYL POLYMERS

This invention relates to antistatic, thermoplastic moulding compounds consisting of a thermoplastic, aromatic polycarbonate resin, a graft polymer and optionally a thermoplastic vinyl polymer based on aromatic vinyl compounds and other vinyl monomers, which moulding compounds contain a polyether modified by a radical former as antistatic agent.

Most synthetic materials are electric insulators with high surface resistance due to their chemical constitution. The surfaces of such synthetic materials therefore readily come electrostatically charged when processed and in use. This frequently leads to trouble in practice, e.g. rapid accumulation of dirt and dust on the synthetic material parts with the formation of characteristic dust figures on the surface. This applies particularly to polymers of aromatic vinyl compounds and acrylonitrile used as moulding compounds, optionally modified with rubber, e.g. styrene-acrylonitrile copolymers (SAN) and graft polymers of styrene and acrylonitrile on a basis of polybutadiene (ABS).

It is known to treat such moulding compounds with antistatic finishes. Substances which have been recommended as antistatic agents for this purpose include, for example, alkyl and aryl sulphonates (DE-OS 1 544 652), amines (DE-PS 1 258 083), quaternary ammonium salts, amides, phosphoric acids and alkyl and arylphosphonates.

Polyethers which have been proposed as high molecular weight antistatic agents, e.g. in DE-PS 1 244 398, are required to be used in quantities of about 5% by weight or more for reliable antistatic finishing of styrene polymers. This leads to patchy and smeary surfaces and even surface deposits on the finished synthetic material parts.

The antistatic agents mentioned above for aromatic vinyl polymers cannot be used in mixtures of these vinyl polymers with aromatic polycarbonates as they would either cause degradation of the aromatic polycarbonate or be too ineffctive.

It has now been found that highly effective anti-static agents for mixtures of aromatic polycarbonates and aromatic vinyl polymers may be obtained by the treatment of polyalkylene ethers with radical forming substances. These antistatic agents do not impair the mechanical properties, the surface properties or the colour or thermostability of the aromatic vinyl polymers. The antistatic effect is greatly improved, especially by comparison with that obtained with unmodified polyalkylene ethers.

The present invention thus relates to antistatic, thermoplastic moulding compounds consisting of I. 99.8 to 95% by weight, preferably 99 to 97% by weight, of a mixture consisting of an aromatic polycarbonate, a graft polymer and optionally a thermoplastic vinyl polymer and/or usual additives and II. 0.2 to 5.0% by weight, preferably 1.0 to 3.0% by weight, of a polyalkylene ether which has been modified with a radical former.

The invention further relates to a process for the antistatic finishing of a mixture of aromatic polycarbonate, a graft polymer and optionally a thermoplastic vinyl polymer and/or the usual additives, characterised in that from 0.2 to 5.0% by weight, preferably from 1 to 3% by weight, of an antistatic agent consisting of a polyalkylene ether which has been modified by a radical former are added to such a mixture.

Polymer mixture I in the context of the present invention consists of (A) 95-10% by weight, preferably 90-10% by weight and most preferably 85-25% by weight, of a thermoplastic, aromatic polycarbonate or a mixture of several aromatic polycarbonates, (B) 5-90% by weight, preferably 10-90% by weight and most preferably 15-75% by weight, of a mixture of (Ba) from 100-0 parts by weight, preferably from 100 20 parts by weight and most preferably from 100 30 parts by weight of one or more graft polymers and (Bb) from 0-100 parts by weight, preferably from 0 80 parts by weight and most preferably from 0-70 parts by weight of one or more thermoplastic vinyl copolymers.

Thermoplastic, aromatic polycarbonates A suitable for the purpose of this invention include those based on diphenols corresponding to the following formula (II)

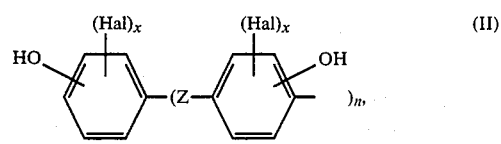

wherein Z denotes a single bond, a $C_1$-$C_5$-alkylene group, a $C_2$-$C_5$-alkylidene group, a $C_5$-$C_6$-cycloalkylidene group, S or $SO_2$; Hal denotes chlorine or bromine; x denotes 0, 1 or 2 and n denotes 1 or 0, and optionally diphenols corresponding to formula (IIa):

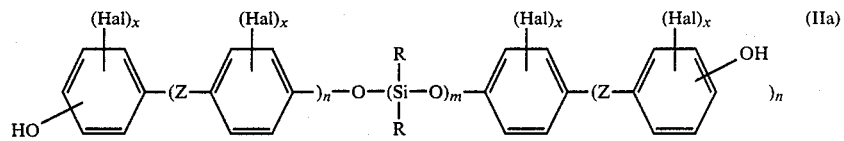

wherein Z, Hal, x and n have the meanings indicated for formula (II) and the groups R, which may be identical or different, denote straight chained $C_1$-$C_{20}$-alkyl groups, branched $C_3$-$C_{20}$-alkyl groups or $C_6$-$C_{20}$-aryl groups, preferably $CH_3$, and m denotes an integer with a value from 5 to 100, preferably from 20 to 80.

The polycarbonates A which are suitable for the purpose of this invention include homopolycarbonates and copolycarbonates, diphenols corresponding to the formula (IIa) being used only for the preparation of copolycarbonates with diphenols of the formula (II) and their proportion by weight in the copolycarbonates amounting to 1 to 20% by weight, preferably 1.5 to 15% by weight, in particular 2 to 10% by weight, based in each case on the total weight of the diphenols of formulae II and IIa.

Component A may also consist of mixtures of the thermoplastic polycarbonates defined above. If they are mixtures with polydiorganosiloxane-polycarbonate block copolymers, the proportion by weight of the diphenols (IIa), based on the total sum of diphenols in the polycarbonate mixture, amounts to 1 to 20% by weight.

Polycarbonates A suitable for the present invention are known and may be prepared, for example, with phosgene by the phase interface process or with phosgene by the homogeneous phase process, the so-called pyridine process, and the molecular weight may be adjusted in a known manner by means of known chain breaking agents. (For polycarbonates containing polydiorganosiloxane, see DE-OS 3 334 873.)

Examples of suitable chain breaking agents include phenol, p-chlorophenol, p-tert.-butylphenol and 2,4,6-tribromophenol, long chained alkylphenols such as 4-(1,3-tetramethyl-butyl)-phenol according to DE-OS 2 842 005, or monoalkylphenols or dialkylphenols with a total of 8 to 20 carbon atoms in the alkyl substituents according to DE-OS 3 506 472, such as 3,5-ditert.-butylphenol, p-iso-octylphenol, p-tert.-octyl-phenol, p-dodecylphenol, 2-(3,5-dimethyl-heptyl)-phenol and 4-(3,5-dimethyl-heptyl)-phenol. The quantity of chain breaking agents to be used is generally from 0.5 mol-% to 10 mol-%, based on the sum of the diphenols (II) and optionally (IIa) put into the process.

Polycarbonates A suitable for the present invention have weight average molecular weight (Mw, determined, for example, by ultracentrifugation or scattered light measurement) of from 10,000 to 200,000, preferably from 20,000 to 80,000.

Examples of suitable diphenols corresponding to formula (II) include hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols corresponding to formula (II) include 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Suitable diphenols corresponding to the formula (IIa) include those in which R stands for methyl, ethyl, propyl, n-butyl, tert.-butyl or phenyl.

Preferred diphenols corresponding to formula (IIa) include those corresponding to the following formula (IIb):

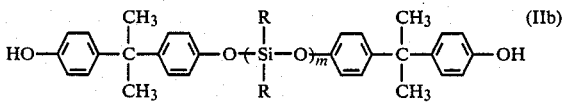

wherein the groups R are identical and have the meanings indicated above, i.e. preferably methyl, etc. or phenyl, and m stands for an integer with a value from 5 to 100, preferably from 20 to 80.

Diphenols corresponding to the formula (IIa) may be prepared from the corresponding bis-chloro compounds (III)

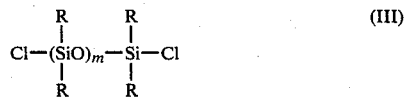

and diphenols (II), for example according to U.S. Pat. No. 3,419,634 in combination with U.S. Pat. No. 3,189,662.

In the bis-chloro compounds (III), R and m have the same meanings as in the diphenols (IIa) and (IIb).

Polycarbonates A suitable for the purpose of this invention may be branched in a known manner, preferably by the incorporation of from 0.05 to 2.0 mol-%, based on the sum of diphenols put into the process, of tri-functional or higher functional compounds, for example compounds with three or more than three phenolic groups.

Preferred polycarbonates, apart from the bisphenol A homopolycarbonate, include copolycarbonates of bisphenol A with up to 15 mol-%, based on the molar sums of diphenols, of 2,2-bis-(3,5-dibromo-4-hydroxyphenyl)-propane or the copolycarbonates of diphenols of formula (II) with 1 to 20% by weight of diphenols of formula (IIa), preferably of formula (IIb), based in each case on the sum of the weights of diphenols (II) and (IIa) or of the diphenols (II) and (IIb).

Suitable graft polymers Ba include those in which styrene, α-methylstyrene, methylmethacrylate or a mixture of 95 to 50% by weight of styrene, α-methylstyrene, nuclear substituted styrene, methylmethacrylate or mixtures thereof and 5 to 50% by weight of acrylonitrile, methacrylonitrile, maleic acid anhydride, N-substituted maleimide, methylmethacrylate or mixtures thereof (graft scion) have been grafted on a rubber (graft stock).

Rubbers suitable for the preparation of graft polymers Ba include in particular polybutadiene, butadienestyrene copolymers (both of which may also be copolymerised with up to 30% by weight, based on the weight of the rubber, of a lower alkyl ester of acrylic or methacrylic acid such as methylmethacrylate, ethylacrylate, methylacrylate or ethylmethacrylate), polyisoprene, polychloroprene, alkylacrylate rubbers (of $C_1$-$C_8$-alkylacrylates, in particular ethyl-, butyl-, ethylhexylacrylate). The alkyl acrylate rubbers may contain up to 30% by weight, based on the weight of the rubber, of monomers such as vinyl acetate, acrylonitrile, styrene, methylmethacrylate and/or vinyl ethers incorporated by copolymerisation, and minor quantities, preferably up to 5% by weight, based on the weight of rubber, of ethylenically unsaturated monomers which have a cross-linking action. Cross-linking agents of this kind include, for example, alkylenediol di(meth)acrylates, polyester di(meth)acrylates, divinylbenzene, trivinylbenzene, triallylcyanurate, allyl(meth)acrylate, butadiene and isoprene. Acrylate rubbers which contain a cross-linked diene rubber of one or more conjugated dienes and optionally an ethylenically unsaturated monomer such as styrene and/or acrylonitrile as nucleus may also be used. Other suitable rubbers include, for example, EPDM rubbers, i.e. rubbers of ethylene, propylene and an unconjugated diene.

Diene rubbers and alkylacrylate rubbers are preferred rubbers for the preparation of graft polymers Ba.

Acrylate rubbers are particularly suitable if they have a core-sheath structure, i.e. if they contain a core of a different polymer enclosed by a sheat of cross-linked alkylacrylate rubber.

The rubbers are present in the graft polymer Ba in the form of at least partially cross-linked particles having an average particle size of from 0.05 to 5 μm, in particular from 0.075 to 1 μm, and they preferably have gel contents of at least 70% by weight.

The graft polymers Ba are prepared by radical graft polymerisation in emulsion, solution or suspension or solvent-free of the monomer mixtures mentioned above in the presence of these rubbers.

The graft scion of the graft product Ba composed of the above-mentioned polymer mixtures may be produced, for example, by polymerisation of the corresponding monomers in the presence of a latex (emulsion) of the graft stock. Polymerisation may be initiated by radical initiators, e.g. by persulphates, perioxides, percarbonates or peresters but especially by water-soluble initiators such as persulphates or redox initiator systems. Polymerisation processes of this type are known.

Preferred graft scions are obtained by the graft polymerisation of a monomer mixture of from 50 to 95% by weight of styrene, α-methylstyrene, nuclear substituted styrene, methylmethacrylate or mixtures thereof and from 50 to 5 parts by weight of (meth)acrylonitrile, methyl methacrylate, maleic acid anhydride, N-substituted maleimide or mixtures thereof.

Preferred copolymers Bb are those of styrene, α-methylstyrene, nuclear substituted styrene or mixtures thereof with acrylonitrile, methacrylonitrile, methylmethacrylate, maleic acid anhydride, N-substituted maleimide or mixtures thereof.

Thermoplastic copolymers having a composition according to Bb are frequently formed as by-products of the graft polymerisation carried out for the preparation of component Ba, especially when large quantities of monomers are grafted on small quantities of rubber.

The quantity of copolymer Bb to be used according to the invention, amounting to 0 to 80 parts by weight, preferably 0 to 70 parts by weight, based on 100 parts by weight of A +Ba +Bb, does not incluee this by-product of graft polymerisation.

The copolymers having the composition of component Bb are resinous, thermoplastic and free from rubber. Particularly preferred copolymers Bb are those obtained from styrene and/or α-methylstyrene with acrylonitrile and optionally with methylmethacrylate.

Halogenated styrenes and p-methylstyrenes are examples of nuclear substituted styrenes.

Particularly preferred ratios by weight in the thermoplastic copolymer Bb are 60 to 80% by weight of styrene and/or α-methylstyrene and 40 to 20% by weight of acrylonitrile or methylmethacrylate.

The copolymers conforming to the definition of component Bb are known and may be prepared by radical polymerisation, in particular by emulsion, suspension, solution or solvent-free polymerisation. The copolymers constituting component Bb preferably have molecular weights Mw (weight average determined by light scattering or sedimentation) of from 15,000 to 2000,000 and limiting viscosity numbers of from 20 to 110 ml/g (determined in dimethylformamide at 25° C.).

The modified polyethers (II) according to the present invention are prepared by the treatment of polyethers with radical formers.

The polyalkylene ethers which are to be modified according to the invention ("starting polyethers") are synthesized from difunctional and polyfunctional (cyclo)aliphatic residues and may also contain small quantities of olefinic groups. Examples of suitable starting polyethers include, for example, the reaction products of di- or polyols, e.g. ethylene glycol, 1,2-propylene glycol, trimethylolpropane, glycerol, pentaerythritol, sorbitol and mannitol, and one or more alkylene oxides such as ethylene oxide and propylene oxide (for preparation and use, see Ullmanns Encyklopädie der technischen Chemie, 4th Edition, Vol. 19, page 31, Verlag Chemie, Weinheim 1980). Polyalkylene glycols containing high porportions of 1,2-propylene structures are preferred.

Both straight chained and branched polyalkylene glycols may be used, moderately branched types being preferred.

The "starting" polyalkylene glycols have molecular weights of from 500 to 15,000, preferably from 1,000 to 10,000 and most preferably from 2,000 to 5,000.

The radical forming substances used as initiators for radical polymerisation may be the conventional commercially available compounds as well as any other compounds which rapidly decompose into radicals at temperatures of from 20 to 200° C. These include, for example, diacylperoxides such as dibenzoylperoxide, substituted dibenzoylperoxides and dilauroylperoxide acylsulphonylperoxides such as acetylcyclohexane sulphonylperoxide, peroxy-dicarbonates such as dicyclohexyl-and di-tert.-butyl-peroxydicarboante, acyl peresters such as tert.-butyl-perpivalate and tert.-butylperbenzoate, dialkylperoxides such as dicumyl and di-tert.-butylperoxide, hydroperoxides such as cumyl hydroperoxide and tert.-butyl hydroperoxide and other peroxy compounds as well as aliphatic and araliphatic azo compounds. Preferred radical formers decompose sufficiently rapidly at temperatures in the range of from 60 to 140° C., e.g. azodiisobutyronitrile, di-tert.-butylperoxide, dibenzoylperoxide, tert.-butylperbenzoate, dicumylperoxide and 1,3-bis-(tert.-butylperoxyisopropyl)-benzene. Dibenzoylperoxide is especially preferred.

The quantity of radical former, based on the quantity of polyalkylene glycol, is from 5 to 0.05% by weight, preferably from 2.0 to 0.1% by weight, most preferably from 1.0 to 0.25% by weight.

The modified polyalkylene ethers according to the invention may be prepared by simply stirring the radical former and the polyalkylene glycol together at temperatures of from 50 to 150° C.

The modified polyalkylene ethers obtained may be incorporated by known methods into the polymers which are to be antistatically finished, e.g. by kneading or rolling the two components together or by extrusion.

In another embodiment of this invention, a mixture of a radical former to be used according to the invention and a polyether to be used according to the invention may be incorporated into the polymer in the given proportion under the usual processing conditions, e.g. in a kneader or extruder at 160 to 220° C.

In addition to the antistatic agents according to the invention, the usual additives such as pigments, fillers, stabilizers, lubricants, mould release agents and the like may be added to the moulding compounds.

The resulting moulding compounds according to the invention are worked up into finished products such as housing parts for domestic and electrical appliances, profiled parts, foils, parts for interior fittings of motor vehicles, etc. by the usual methods employed for thermoplasts.

The finished moulded parts are distinguished by excellent antistatic properties and in paritcular their homogeneous and glossy surfaces, which are free from deposits. The mechanical properties, especially the dimensional stability under heat and the impact strength, including the impact strength at low temperatures, are virtually the same as those of the unmodified material and the colour of the moulded parts is also unaffected.

EXAMPLES

Polymers for the preparation of polymer mixture I:

(A) Graft rubber prepared by emulsion polymerisation from 50% by weight of a polybutadiene stock having an average particle diameter ($d_{50}$) of 0.4 μm on which 36% by weight of styrene and 14% by weight of acrylonitrile have been grafted.

(B) Styrene/acrylonitrile (SAN)=72:28 copolymer having a molecular weight Mw of about 80,000 with $M_w/M_n - 1 \leq 2$.

(C) Aromatic polycarbonate of 2.2-bis-(4-hydroxyphenyl)-propane (bisphenol A) having a relative viscosity of 1.26 determined in $CH_2Cl_2$ at 25° C. (0.5% by weight solution).

EXAMPLE 1

1.00 kg of a straight chained polypropylene glycol with $M_n=2000$ (OH number =56) were degasified with heating to 120° C. under vacuum and saturated with nitrogen. 6.6 g of commercial dibenzoylperoxide are added at a temperature below 40° C. and the mixture is heated in a nitrogen atmosphere to 80°–85° C. for 8 hours.

EXAMPLE 2

24 Parts by weight of polymer A, 16 parts by weight of polymer B, 60 parts by weight of polymer C, 1 part by weight of pentaerythritol stearate and 1.5 parts by weight of the antistatic agent described in Example 1 were mixed together in an internal kneader at 200° C. The material obtained was granulated and made up into sample bodies by injection moulding at 260° C.

The following data were obtained: $a_k$ at room temperature according to DIN 53 453: 22.8 kJ/m²

Vicat B according to DIN 53 460: 116° C., MFI 260/5 according to DIN 53 735: 16.0 g/10 min, Dust figures: no deposit.

EXAMPLE 3 for comparison

The mixture of polymers and lubricants described in Example 2 was worked up as described in that Example without the addition of polyether. The following test data were obtained:

$a_k$ at room temperature according to DIN 53 453: 25.9 kJ/m²,

Vicat B according to DIN 53 460: 118°C.,

MFI 260/5 according to DIN 53 735: 12.9 g/10 min,

Dust figures: heavy deposit.

It may be seen from Examples 2 and 3 that the addition of polyethers according to this invention results in a marked improvement in fluidity as well as producing an excellent antistatic effect.

We claim:

1. Thermoplastic moulding compositions comprising: 99.8 to 95% by weight of a mixture of an aromatic polycarbonate and
   (A) 0–100% by weight of the sum of (A) and (B) of one or more graft polymers comprise the monomers styrene, α-methyl styrene, methyl methacrylate, or a mixture of 95–50% by weight of styrene, α-methyl styrene, ring substituted styrene, methyl methacrylate or mixtures thereof with 5–50% by weight of methacrylonitrile, acrylonitrile, maleric acid anhydride, N-substituted malerimides or mixtures thereof, grafted onto a rubber substrate, and
   (B) 100 to 0%, by weight of one or more thermoplastic vinyl copolymers, and II. 0.2 to 5% by weight of a polyalkylene ether which is modified at 50° C. to 150° C. with a radical former.

2. A process for the antistatic finishing of a mixture of aromatic polycarbonate, a graft polymer and optionally a thermoplastic vinyl polymer and/or the usual additives, characterised in that from 0.2 to 5% by weight of a polyalkylene ether which has been modifed with a radical former are added to such a mixture.

3. A composition according to claim 1 wherein component I contains 95 to 10% by weight of polycarbonate.

4. A composition according to claim 1 wherein the graft component I. (A) is 100 to 20 parts by weight of I. (A) and I.B)

* * * * *